(12) United States Patent
Zhang et al.

(10) Patent No.: US 7,924,975 B2
(45) Date of Patent: Apr. 12, 2011

(54) LINEAR TRACK SCANNING IMAGING SYSTEM AND METHOD

(75) Inventors: Li Zhang, Beijing (CN); Yinong Liu, Beijing (CN); Zhiqiang Chen, Beijing (CN); Yuanjing Li, Beijing (CN); Hewei Gao, Beijing (CN); Yuxiang Xing, Beijing (CN); Ziran Zhao, Beijing (CN); Yongshun Xiao, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 100 days.

(21) Appl. No.: 12/419,603

(22) Filed: Apr. 7, 2009

(65) Prior Publication Data

US 2009/0262891 A1   Oct. 22, 2009

(30) Foreign Application Priority Data

Apr. 17, 2008   (CN) .......................... 2008 1 0104271

(51) Int. Cl.
*G01N 23/04* (2006.01)

(52) U.S. Cl. ......................................................... 378/57
(58) Field of Classification Search .................... 378/57, 378/68, 69
See application file for complete search history.

(56) References Cited

FOREIGN PATENT DOCUMENTS

| CN | 1971414 | 5/2007 |
|---|---|---|
| CN | 1971620 | 5/2007 |
| CN | 101071109 | 11/2007 |

*Primary Examiner* — Courtney Thomas
(74) *Attorney, Agent, or Firm* — Kenyon & Kenyon LLP

(57) ABSTRACT

In a linear track scanning imaging system and method, the imaging system may include: a ray generating unit having a plurality of ray sources that emit beams alternately, only one ray source at a time; an actuating arrangement causing an object under examination to move with respect to the linear track scanning imaging system along a linear track, leading the object to pass through a scanning area of the linear track scanning imaging system; a data collecting unit that collects projection data of the object for each ray source; an imaging unit that reconstructs an image of the object under examination based on the projection data collected for each ray source; and a display unit for displaying the reconstructed image.

33 Claims, 8 Drawing Sheets

(a) original image of a model (b) for the total scanning viewing angle being 90 degrees (c) for the total scanning viewing angle being 120 degrees (d) for the total scanning viewing angle being 150 degrees

LINEAR TRACK SCANNING IMAGING SYSTEM AND METHOD

FIELD OF THE INVENTION

The present invention relates to the field of radiation imaging, and more particularly, to a linear track scanning imaging system and method thereof.

BACKGROUND INFORMATION

Safety inspection is of great significance in the fields of anti-terrorism, cracking down on drug trafficking and smuggling, etc. After the U.S. September 11th event, more and more attention is paid to safety inspection all over the world, and especially at public locations such as airports, stations, customs, and dock, etc., a series of safety inspection measures is taken to perform a strict inspection on passengers' baggage and articles, cargo container, etc.

Currently, a predominant imaging technology employed by a widely used safety inspection system is radiation imaging technology. According to the principle of rays' exponential decay, the radiation imaging technology adopts a system in which a ray source irradiates an object under examination on one side of the object under examination, and a ray collecting arrangement receives the rays after they have passed through the object under examination. The ray collecting arrangement converts the received rays into a digital signal and outputs the digital signal to a computer for imaging. The computer processes the collected data, synthesizes or reconstructs an image, and displays the image. A safety inspection system employing the radiation imaging technology is capable of performing tomography or perspective imaging. Tomography illustrates tomographic images of an object under examination and can combine multiple layers of tomographic images into a three-dimensional (3D) stereo image. Perspective imaging illustrates a two-dimensional (2D) perspective image of an object under examination.

A tomography safety inspection system generally requires a computed tomography (CT) device, where at least one of the object under examination and the ray sources are capable of being rotated, since tomography requires the ray collecting arrangement to receive omnidirectional irradiation of the object under examination to obtain transmissive projection data of the ray beam. In a practical application, it is generally required for the safety inspection system to inspect on-line in real time, requiring a very high imaging speed of the safety inspection system. For inspection of civil aviation articles, for example, since the customs affair rate is required not to be more than 0.5 meters per second, it is very difficult for even the helical CT device with a large pitch to meet the requirement. Furthermore, for a large object such as a customs container, it is very difficult to rotate the container or the ray source. In addition, the cost of the CT device is very high. Because of these factors, the safety inspection system that performs stereo imaging with the CT device is not widely used.

Compared to the tomography safety inspection system, a perspective imaging safety inspection system is widely used in public locations such as airports, stations, customs and dock, etc. However, the perspective imaging safety inspection system cannot avoid an overlap effect of an object in the ray direction and solve the overlap problem of an object in the ray direction, resulting in the fact that the performance of the perspective imaging safety inspection system is considerably low.

A single-segment and multi-segment linear track scanning imaging mode is proposed in U.S. Patent Application Publication Nos. 20701161777, 20070116175 (which issued as U.S. Pat. No. 7,424,089), and 20080075226 (which issued as U.S. Pat. No. 7,499,522); which correspond respectively to Chinese Patent Application Nos. 200510123587.6 (published as Chinese Patent Application Publication No. 1971414), 200510123588.0 (published as Chinese Patent Application Publication No. 1971620), and 200610076573.8 (published as Chinese Patent Application Publication No. 101071109), all of which are incorporated by reference in their entireties, where, in the course of scanning, an object to be examined, located between a ray source and an array of detectors, is made to move linearly relative to the ray source and the array of detectors (the field angle formed by the ray source and the array of detectors is the scanning viewing angle when imaging), and there is no relative rotation between the ray source and the array of detectors and the object, which may substantially meet the requirement of fast imaging of the safety inspection system and solve the problems that it is difficult to rotate a large object and that there is object overlap in the ray direction of the perspective imaging safety inspection system. In multi-segment linear track scanning imaging, the travel track of an object under examination includes at least two segments of linear tracks having an angle between one another; and the object under examination only performs translational movement in the at least two segments of linear tracks with no rotation at all. The multi-segment linear track scanning imaging mode may enlarge the scanning viewing angle of the system by multiple times (depending on the number of the segments of linear tracks and the number of arrays of detectors) by irradiating the object under examination multiple times with the same ray source through the use of a plurality of arrays of detectors arranged in the multi-segment linear tracks, and may thus solve the problem of limited angle projection existing in the practical application of a single segment. However, there is a common disadvantage among the above-mentioned imaging systems: in order to cause the detector and the ray source to form a sufficiently large scanning viewing angle to achieve a high quality image, the detector should cover a sufficiently long range in the movement direction of the object, thereby resulting in a high cost of the detector in the imaging system and a long scanning distance of the examined object.

SUMMARY OF THE INVENTION

An object of the present invention is to provide a linear track scanning imaging system, which may meet the requirement of fast imaging of a safety inspection system, solve the problems that it is difficult to rotate a large object and that there is object overlap in the ray direction of a perspective imaging safety inspection system, and achieve a larger scanning viewing angle with a shorter detector as compared to other systems.

The above-mentioned object is achieved by a linear track scanning imaging system in accordance with the present invention. The linear track scanning imaging system includes: a ray generating unit including a plurality of ray sources, where the plurality of ray sources emit beams alternately and only one ray source emits a beam at any one time; an actuating arrangement for causing an object under examination to perform a relative movement with respect to the linear track scanning system along a linear track, thereby leading the object under examination to pass through the scanning area of the linear track scanning imaging system; a data collecting unit that collects the respective projection data of the object under examination for, respectively, each ray source; an imaging unit which reconstructs an image of the object under examination based on the projection data collected for each ray source; and a display unit for displaying the reconstructed image.

Another object of the invention is to provide a linear track scanning imaging method including the steps of: an object under examination moving with respect to a scanning imaging system into the scanning area of the scanning imaging system; controlling a plurality of ray sources to alternately emit beams and ensuring that only one ray source emits a beam at any one time; for each ray source, one array of detectors collecting respective corresponding projection data; reconstructing an image of the object under examination based on the projection data collected for each ray source; and displaying the reconstructed image.

In an example embodiment of the present invention, the plurality of array sources are arranged according to a certain spatial distribution and emit beams alternately according to a certain time sequence, such that it is possible to achieve a large scanning viewing angle with a short detector length, thereby reducing the number of the detector units required by the system and shortening the total scanning distance of the examined object.

In an example embodiment of the present invention, linear track scanning is employed instead of circular track or helical track scanning, such that the object under examination substantially performs a linear movement, and hence it is not necessary to take into account the centrifugal issue in a circular or helical movement, it is possible to carry out fast imaging of the object under examination, the imaging speed of the object under examination is greatly increased, the imaging time of the object under examination is decreased, and furthermore it is possible to meet the requirement of, and even further improve upon, the customs affair rate for article inspection to a good extent, which is very useful for an inspection system requiring a relatively high customs affair rate.

Since embodiments of the present invention utilize linear track scanning instead of circular track or helical track scanning, the object under examination moves linearly, and it is not necessary to rotate a large object anymore, therefore the problem that there is difficulty in rotating a large object is overcome, which is very useful for an inspection system needing to inspect a large object.

Since embodiments of the present invention may obtain a tomography image and a stereo image of the object under examination, the present invention solves to a good extent the problem of object overlap existing in a traditional perspective imaging safety inspection system when imaging. Moreover, the invention may also obtain conventional perspective images of a single or multiple viewing angles. Thus, an example system according to an embodiment of the present invention may perform an initial examination of the object under examination by first acquiring a perspective image thereof, implement tomography for the object under examination only when there is found a possible suspect region, and thereby further perform an examination on the suspect region.

Since embodiments according to the present invention do not need to rotate the object under examination or the ray sources and utilize the characteristic of linear movement of the object under examination in the existing safety inspection system, the mechanical design of the invention is very simple and the implementation cost is also very low.

DETAILED DESCRIPTION

The following detailed description of embodiments is intended only to illustrate the invention, and not to limit the protective scope of the invention.

Figure 2:
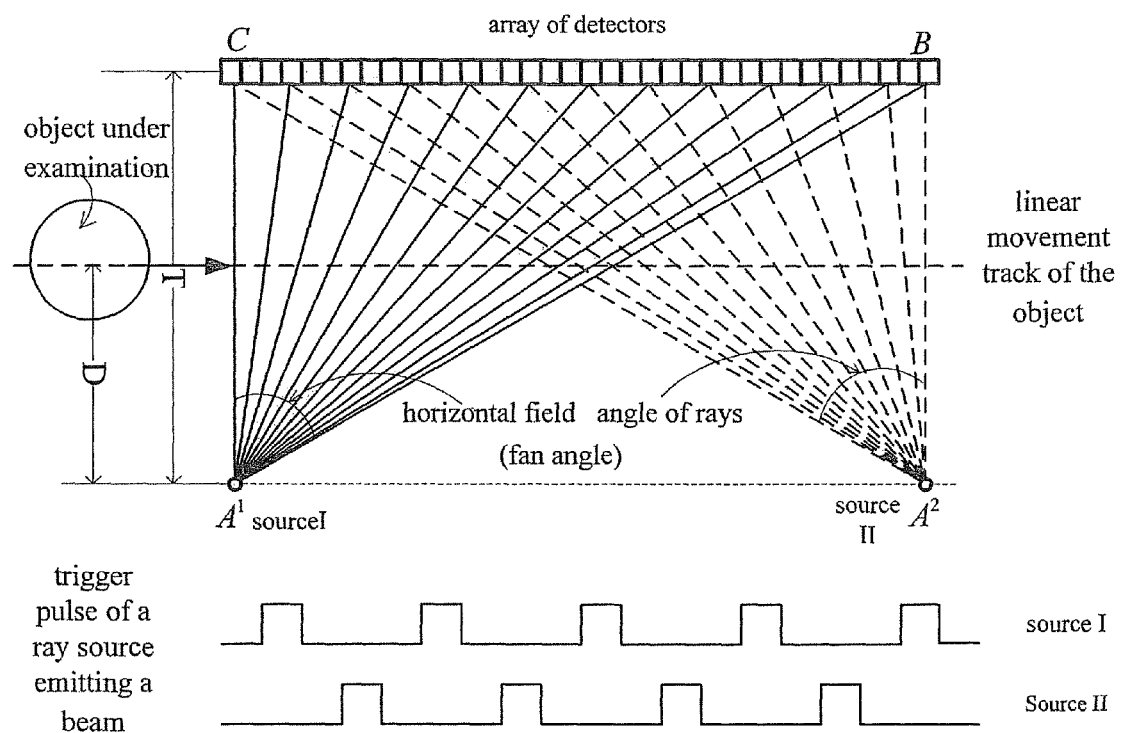
FIG. 2 is a planar schematic diagram of a dual source linear track scanning imaging system, according to an example embodiment of the present invention.

In an example embodiment of the present invention, a multi-source linear track scanning imaging system achieves stereo imaging by employing multi-source linear track scanning to obtain projection data and using CT image reconstruction and data processing techniques to obtain a tomographic image. The travel track of an object under examination is a linear track. The receiving plane of an array of detectors is arranged to be parallel to its corresponding linear track, at least two ray sources arranged on a same side as each other with respect to the array of detectors, and preferably distributed in a line parallel to the moving track of the object under examination. The individual ray sources form respectively a separate scanning viewing angle with the array of detectors, but partial overlap is allowed. In operation, a ray generating unit and a data collecting unit keep stationary and the object under examination moves along its travel track. When the object under examination is ready to enter into the scanning area of a first ray source (which can be detected by a position triggering means), the system starts to collect data. The ray sources utilizes a pulse operation mode to emit beams alternately (as shown in FIG. 2). As a result, the system can achieve a larger range of scanning viewing angle with an array of detectors of a short length, thereby perform tomography of a high quality on the object under examination, and at the same time implement conventional perspective imaging on the object under examination at different angles.

Figure 1:
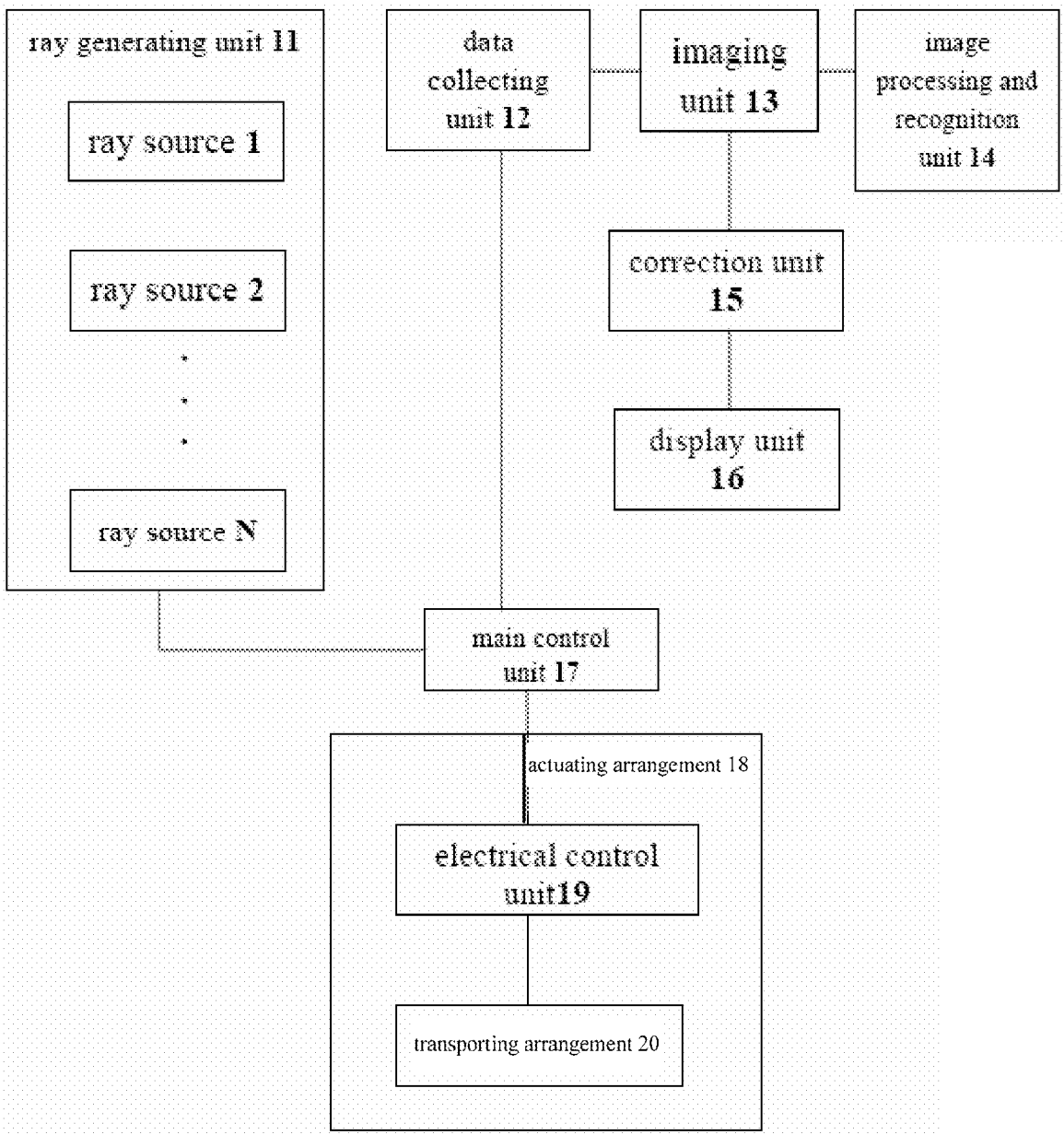
FIG. 1 is a block diagram that illustrates a multi-source linear track scanning imaging system, according to an example embodiment of the present invention.

FIG. 1 shows a multi-source linear track scanning imaging system according to an example embodiment of the present invention. The multi-source linear track scanning imaging system includes a ray generating unit 11, an actuating arrangement 18, a data collecting unit 12, and a display unit 16. In a preferred embodiment, the multi-source linear track scanning imaging system includes one or more of an imaging unit 13, an image processing and recognition unit 14, a correction unit 15, and a main control unit 17.

The ray generating unit 11 includes a plurality of ray sources 1 . . . N for generating ray beams for transmission to and passing through an object under examination. The ray generating unit 11 includes an X-ray accelerator, an X-ray machine or radioactive isotope, and a corresponding auxiliary device. The total number of the ray sources is greater than or equal to 2, and all the ray sources should be mounted on a same side with respect to the detector, preferably in a same line or a same plane. The individual ray sources form a separate scanning viewing angle with the array of detectors respectively, but partial overlap is allowed. The ray sources may utilize a pulse operation mode, in which each ray source emits a beam alternately at a predetermined interval, and in which only one ray source emits a beam at any one time.

The actuating arrangement 18 may be a mechanical actuating arrangement for carrying and delivering the object under examination (or the ray sources and detector), and confining the travel track of the object under examination in said system. Preferably, the actuating arrangement 18 may include a transporting arrangement 20 and an electrical control unit 19, the transporting arrangement 20 being arranged for supporting and transporting the object under examination (or the ray sources and detector); and the electrical control unit 19 being arranged for controlling the transporting arrangement 20 and thus controlling the movement of the object under examination along the travel path. Since the object movement and the source and detector movement is a relative movement and is equivalent, in the following, while the description is directed to the object movement, it will be apparent that the ray source and detector movement possesses the same effects. In multi-source linear track scanning imaging, the object under examination performs a linear translation following the transporting arrangement, preferably at a uniform velocity.

The data collecting unit 12 is arranged for collecting the transmitted rays passing through the object under examination and converting them into a digital signal. The data collecting unit 12 includes an array of detectors which may be a linear array of detectors or a planar array of detectors, the detectors of which are generally arranged equidistantly or equiangularly for acquiring ray intensity information on conical beam rays after they pass through the examined object and are thus attenuated. The detector may be a solid detector, or may be a gas detector or a semiconductor detector. The detectors need not have a compact arrangement, but need to cover a certain range in the X-axis direction (the movement direction of the examined object), thus forming a certain scanning viewing angle with the individual ray sources. In addition, the data collecting unit 12 further includes: a signal conversion circuit for converting the ray beam signal received by said array of detectors into transmission data; a data processing circuit for combining the transmission data from the signal conversion circuit into projection data; and a logic control circuit for controlling the reception of the ray beam signal by the array of detectors and the transfer of the projection data by the data processing circuit to be performed synchronously. Preferably, during the data collecting, sampling is implemented equidistantly in the translational movement of the object under examination along a linear track. Triggering of data collection needs to be in synchronization with triggering of a ray source emitting a beam for subsequent data processing.

The optional main control unit 17 is responsible for the main control of the entire running process of the imaging system, and includes a mechanical control, electrical control, data collection control, and safety interlock control, etc. It will be clear to those of ordinary skill in the art that the control operations performed by said main control unit 17 may also be carried out in a distributed manner, that is, be carried out by the control of the individual components themselves of the imaging system. Preferably, the main control unit 17 includes a trigger pulse generator for generating a respective trigger pulse sequence for each ray source respectively, which trigger pulse sequence is arranged for controlling the individual ray sources to emit beams alternately in a pulse mode. It is worth noting that the trigger pulse generator may also be located at other positions and generate a trigger pulse sequence under the control of the main control unit 17. Alternatively, without the main control unit 17, the trigger pulse generator interacts with the ray generating unit 11 and the data collecting unit 12, etc., and generates a trigger pulse sequence based on the interaction.

The imaging unit 13 is in charge of processing and reconstructing the projection data collected by the data collecting unit, and thereby generating a perspective image, a tomographic image, and a stereo image of the object under examination. Since the reconstruction process involves the projection data produced by the plurality of ray sources, it is required to make use of the known synchronization relationship between the triggering of data collection and the triggering of the individual ray sources emitting beams to extract the projection data when an individual ray source separately emits a beam. The contributions of the projection data resulting from the individual ray sources to a reconstructed image may be recombined either before image reconstruction or after image reconstruction.

The display unit 16 is used for displaying the image reconstructed by the imaging unit 13. A perspective image may be formed by extracting and combining the output data of a column of the planar array of detectors in a time sequence.

Preferably, in an example embodiment of the present invention, the multi-source linear track scanning imaging system further includes a correction unit 15 for correcting a reconstructed image to optimize the reconstructed image before the reconstructed image is displayed by the display unit 16. The correcting includes detecting inconsistency, hardening correction, scattering correction, metal artifact correction, etc.

Preferably, in an example embodiment of the present invention, the multi-source linear track scanning imaging system further includes an image processing and recognition unit 14 for image processing and pattern recognition, etc. In image processing and pattern recognition, it is a common practice to use techniques such as image enhancement, edge detection, intelligent recognition of dangerous articles, etc.

Preferably, in an example embodiment of the present invention, the multi-source linear track scanning imaging system may first obtain conventional perspective images of a single viewing angle or multiple viewing angles. Thus, the system of the present invention may perform an initial examination on the object under examination by first acquiring a perspective image thereof, implement tomography for the object under examination only when there is found a possible suspect region, and thereby perform a further examination on the suspect region.

FIG. 2 schematically illustrates a planar schematic diagram of a dual source linear track scanning imaging system in accordance with an example embodiment of the present invention. The system may be a stereo imaging safety inspection system. In FIG. 2, the number of ray sources is 2, which are mounted on both the ends of an array of detectors respectively, and the connecting line between them is parallel to the linear movement track of the object under examination. The fan angle of each ray source (the field angle in the movement direction of the object under examination) is 60 degrees. For example, the effective range of scanning viewing angle of a first ray source is 90 to 150 degrees, which effective range of scanning viewing angle refers to the range of incident angle of all those of the rays emitted by a ray source that can reach the array of detectors in the movement direction of an object under examination. The effective range of scanning viewing angle of a second ray source is 30 to 90 degrees, and thus the combination of the two fan angles together just yields a complete range of scanning viewing angle of 120 degrees: 30 to 150 degrees, namely, the scanning viewing angle of the whole imaging system is 120 degrees. It is worth noting that although in this embodiment the fan angles of the two ray sources are equally 60 degrees, they can be other angles and may not be equal to each other. Moreover, there may be a partial overlap between the ranges of scanning viewing angles of the two ray sources. For example, the effective range of scanning viewing angle of a first ray source may be 80 to 140 degrees, the effective range of scanning viewing angle of a second ray source may be 40 to 100 degrees, and thus the resulting scanning viewing angle of the whole system may be in the range of 100 degrees: 40 to 140 degrees. Of course, the first and the second ray source may also have other scanning viewing angles.

Figure 3:
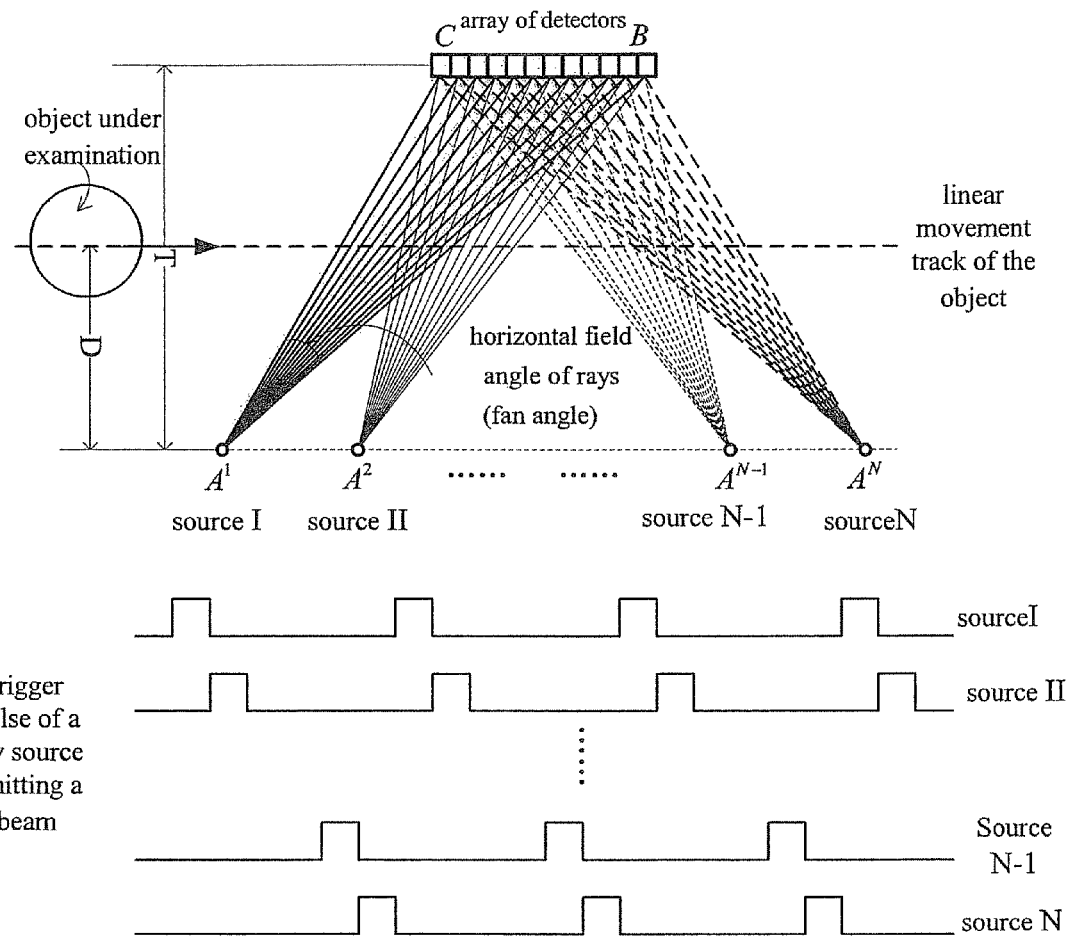
FIG. 3 is a planar schematic diagram of a multi-source (N>2) linear track scanning imaging system, according to an example embodiment of the present invention.

A similar conclusion may be drawn from this for the situation where there is more ray sources (as shown in FIG. 3). The ray sources utilize a pulse operation mode to be triggered alternately at a predetermined interval so as to ensure that only one ray source emits a beam at any one time. The ray source may be an X-ray tube, an accelerator ray source, or isotope source, depending on the size of an object and the application background.

FIG. 3 schematically illustrates a planar schematic diagram of a multi-source (N>2) linear track scanning imaging system, in an example embodiment of the present invention. Like in FIG. 2, the scanning viewing angle of the multi-source linear track scanning imaging system in FIG. 3 is also achieved by combining the fan angle of each ray source. That is, the resulting range of scanning viewing angle of the system is a union set of the effective ranges of scanning viewing angle of the N ray sources. Where the range of scanning viewing angle of each ray source is continuous but does not overlap one another, the resulting scanning viewing angle of the system is the sum of the effective scanning viewing angles of the N ray sources, whereas, where there is a partial overlap between the ranges of scanning viewing angle of some ray sources, the resulting scanning viewing angle of the system is the sum of the effective scanning viewing angles of the N ray sources minus the overlap part.

Figure 4:
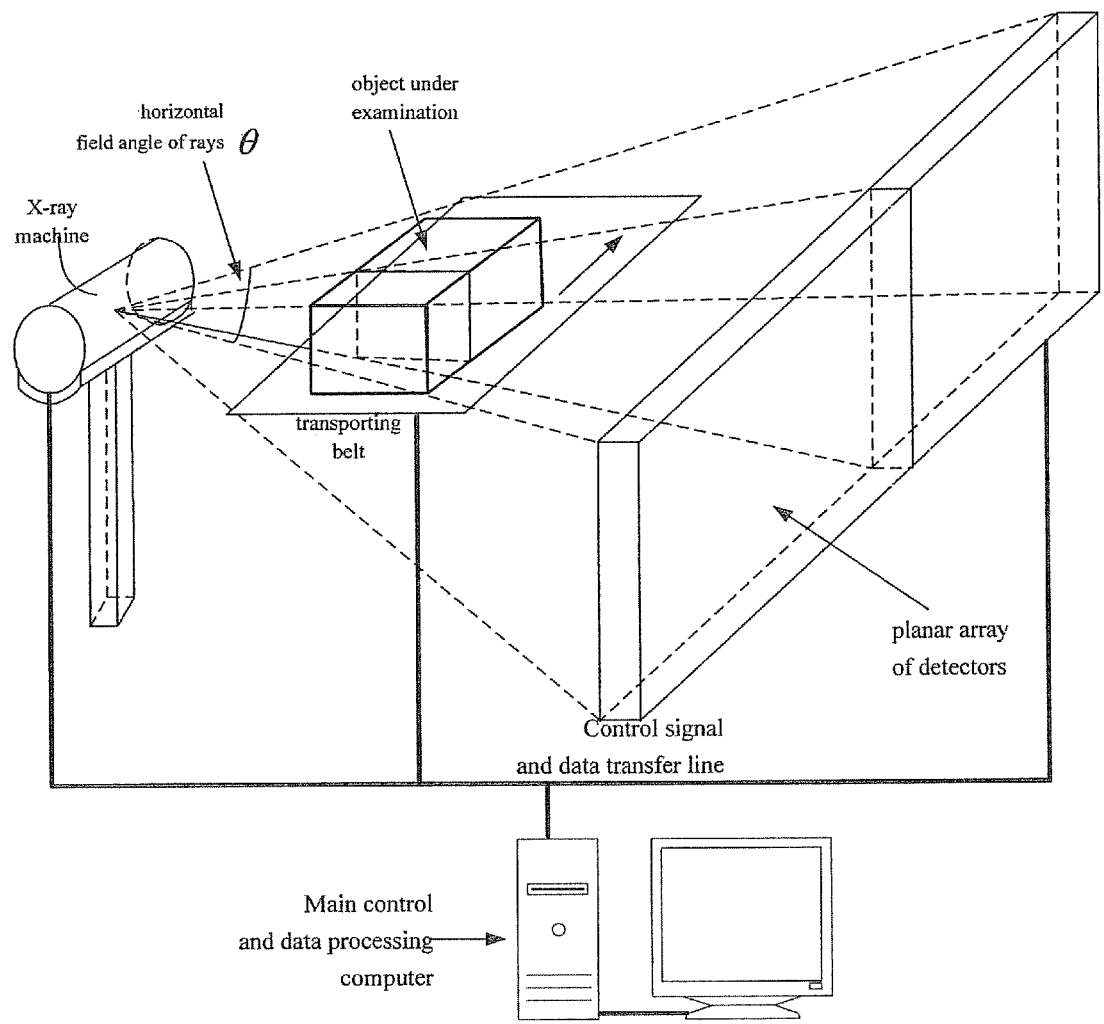
FIG. 4 is a stereo schematic diagram of scanning while a single ray source emits a beam in an imaging system, according to an example embodiment of the present invention.

FIG. 4 schematically illustrates a stereo schematic diagram of scanning while a single ray source emits a beam in an imaging system in accordance with an example embodiment of the present invention.

In FIG. 4, an object under examination is positioned on the transporting platform (shown as a transporting belt in the figure) of the transporting arrangement 20 of the actuating arrangement 18, and transported along a linear track in the multi-source linear track scanning imaging system under the control of the electrical control unit 19.

In FIG. 4, the array of detectors is a planar detector array, located opposite to the ray sources and is perpendicular to a surface of the transporting platform on which the object is transported. The detector covers the object in the vertical direction, and forms in the horizontal direction field angles of 60 degrees with the two ray sources respectively, thereby enabling the total scanning viewing angle in the case of two ray sources to attain 120 degrees. The triggering of collection in the course of data collection needs to be in synchronization with the triggering of the ray sources emitting beams in order that, in the subsequent data processing, data of the two scanning viewing angles of 60 degrees can be recombined into data of a scanning viewing angle of 120 degrees, or the images reconstructed from data of the two scanning viewing angles of 60 degrees can be combined into an image reconstructed from data of a scanning viewing angle of 120 degrees. This will be described in further detail below.

In an example embodiment of the present invention, the control, data transfer, image reconstruction, and data processing of the whole imaging system are all done by a computer (workstation), and the scanning control information, position information, and projection data, etc. are input to a computer workstation via a data collecting system. Reconstruction work of a perspective image, a tomographic image, and a 3D stereo image of an object is done by the workstation and said images are finally displayed on a display. In other words, one or more of the ray generating unit 11, the data collecting unit 12, the imaging unit 13, the image processing and recognition unit 14, the correction unit 15, the display unit 16, and the main control unit 17 may be implemented in the one computer workstation.

In order to achieve an accurate image reconstruction, an imaging system should be able to accurately measure or calibrate the following system parameters: positions of individual ray sources, distances T from the individual ray sources to a detector, distances D from the individual ray sources to the linear movement track of an object under examination, the linear movement speed v of an actuating arrangement, the sampling interval $\Delta t$ of an array of detectors (the spatial equivalent sampling interval of the array of detectors receiving transmission data is $\Delta d = v \Delta t$), and the physical size of the detector, including the physical size of a single detector and the physical size of the array of detectors, etc.

The imaging unit 13 receives from the data collecting unit 12 projection data when the plurality of ray sources emit beams alternately, and reconstructs a tomographic image and a stereo image from the projection data obtained via each ray source. Since the reconstruction process involves projection data produced by the plurality of ray sources, in an example embodiment of the present invention, the known synchronization relationship between the triggering of data collection and the triggering of the individual ray sources emitting beams is used to extract the projection data when an individual ray source separately emits a beam. The contributions of the projection data resulting from the individual ray sources to a reconstructed image may be recombined either before image reconstruction or after image reconstruction. The processing for the former recombination includes causing the projection data of the plurality of ray sources to be equivalent to the projection data of a single source (a single source may imply a corresponding expansion of the coverage range of the array of detectors). The advantage of this kind of processing manner lies in that the problem that there might be an overlap between the scanning viewing angles in the individual ray sources (i.e., redundancy of projection data, which is a very common phenomenon in image reconstruction and can be simply removed by a simple weighting operation) may be explicitly handled. However, this requires the individual ray sources at least to be in a plane parallel to the array of detectors (e.g., the values T, D being the same for all of the individual ray sources). The processing for the latter recombination includes first reconstructing sub-images using projection data produced by the individual ray sources and then performing weighted overlap pixel by pixel on the reconstructed sub-images with the data redundancy taken into account, yielding the final reconstructed image.

In the following, reference will be made to the definitions of the geometric parameters of FIG. 5 to further explain and illustrate the imaging principles of the invention in a mathematical description language.

Although, in practical scanning, the ray sources and the detector may remain fixed while the examined object (to be reconstructed) is made to move from left to right, for the sake of facilitating a mathematical description, according to the principle of relativity of the movement, it is assumed herein when performing image reconstruction that the examined object keeps stationary and the ray sources and the detector as a whole are made to move from right to left. In fact, the multiple ray source linear track scanning imaging system in accordance with the invention may be regarded as formed by combining multiple separate single source systems, while the multiple single source systems share a same array of detectors. As a consequence, the description of a multi-source system may be simplified by describing the operating principles of a single source system.

Figure 5:
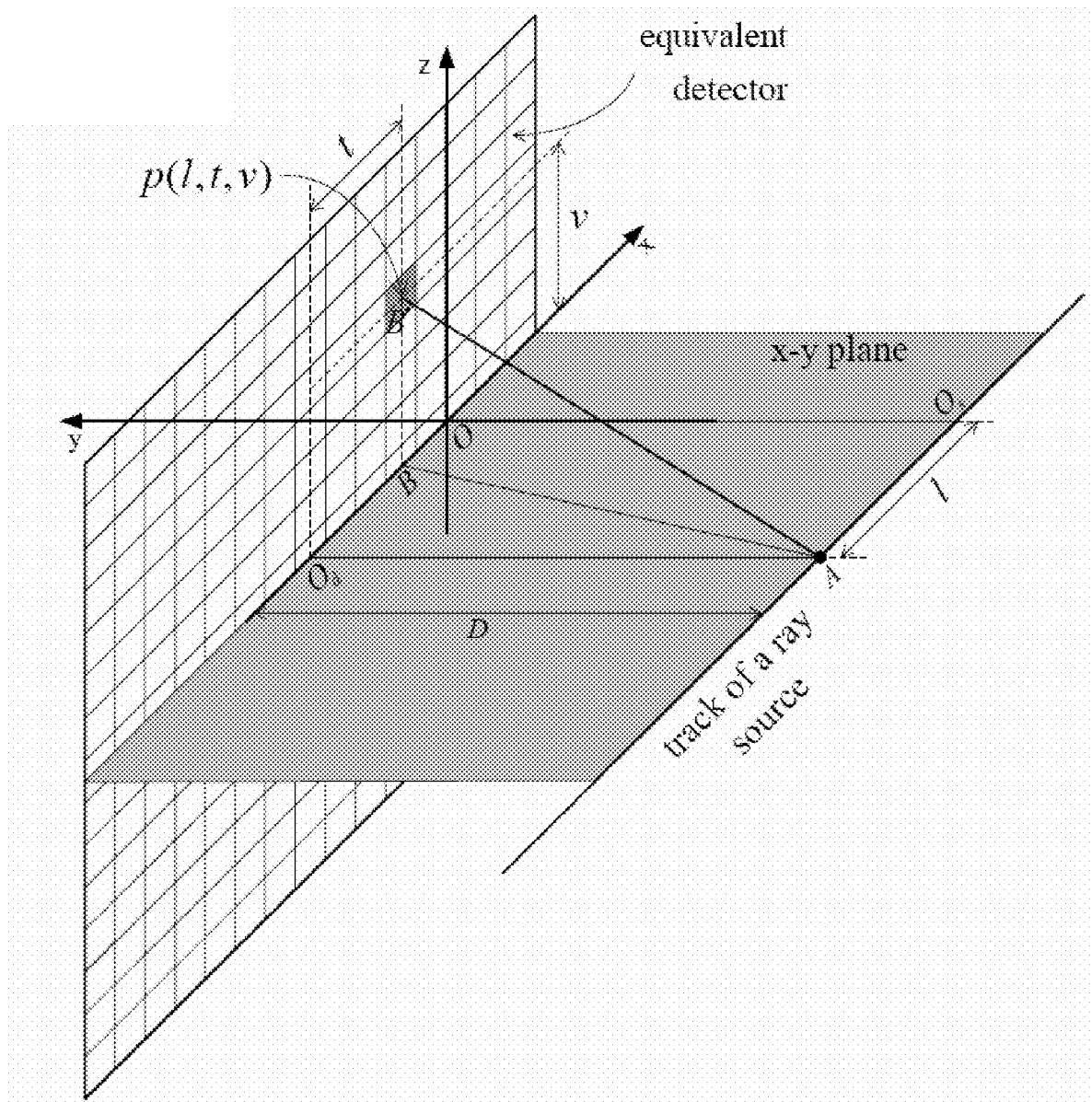
FIG. 5 illustrates the definitions of the scanning geometrical parameters of a linear track imaging system, according to an example embodiment of the present invention.

FIG. 5 schematically illustrates the definitions of the scanning geometrical parameters of a linear track imaging system, the linear track scanning imaging of its corresponding single ray source when emitting a beam being shown in FIG. 4.

FIG. 5 shows an x-y plane that includes a movement track of the ray source and that is perpendicular to the planar array of detectors, where O is the origin of the object coordinate system (x, y, z). Since, for the sake of facilitating a mathematical description, it is assumed that the object under examination is stationary, the origin is also stationary. A perpendicularly projected point $O_s$ of the origin O on the movement track of the ray source is defined to be the positional zero point of the ray source. For convenience, the concept of equivalent detector is utilized herein, namely, the real planar array of detectors is virtually mapped according to a geometrical mapping onto the x-z plane where the origin O of coordinates is located. The perpendicularly projected point $O_d$ of a ray source A on the equivalent detector is set to the positional zero point of the equivalent detector unit, the distance between them being denoted by D. If the ray source and the detector move along the reverse direction of the x axis at the speed of c<0, and at a certain time the index value of the position of the ray source is indicated by l (the offset of it in relation to $O_s$) and the index value of the position of the detector unit is indicated by (t, v) (the horizontal and vertical offsets of it in relation to $O_d$), then the conical beam projection collected by the detector unit may be denoted as p(l, t, v). Therein, the coordinates of the corresponding ray source and the equivalent detector unit in the object coordinate system are respectively (l, −D, 0) and (l+t, 0, v).

The image reconstruction of a single ray source may be implemented by using the linear filtering and reverse projection algorithm. For projection data p(l, t, v), the examined object in the cylindrical coordinate system is represented as f(r,φ,z), the transform from a 3D planar coordinate system to said cylindrical coordinate system is very clear to one of ordinary skill in the art, and thereby will not be described herein in detail. In the cylindrical coordinate system, an approximate estimation $\bar{f}(r,\phi,z)$ of the examined object f(r,φ, z) is $$\bar{f}(r, \phi, z) = \int_{t_{m1}}^{t_{m2}} \frac{1}{\sqrt{D'^2 + t^2}} Q\left(l', t, z\frac{D}{D + r\sin\phi}\right) dt,$$

where $Q(l', t, z) = \int q(l, t, z) h(l' - l) dl;$ $$q(l, t, z) = p(l - t, t, z); l' = r\cos\phi - \frac{tr\sin\phi}{D};$$

and $D' = \sqrt{D^2 + \left(z\frac{D}{D + r\sin\phi}\right)^2}.$

Here, $[t_{m1}, t_{m2}]$ represents the coverage range of the array of detectors in the X direction. h is a kernel function of convolution, the theoretical value of which is $h(l) = \int_{-\infty}^{\infty} |\omega| e^{j2\pi\omega l} d\omega$ and which is discretized generally by adopting a RL or SL filter, where the discrete form of the SL filter is $$h(n) = \frac{-2}{\pi^2(4n^2 - 1)}, n = 0, \pm 1, \pm 2, \ldots .$$

The property of the linear filtering and reverse projection algorithm lies in that a filtering process is performed on the received projection data along the direction l of data collection, and an integration operation is performed on the received projection data along the detector direction t to implement the reverse projection process. This property is determined by the linear scanning track. Compared to a rearrangement algorithm that rearranges the collected data into a parallel beam, the linear filtering and reverse projection algorithm can utilize more substantially each of the received effective projection data, and thus keep better the resolution of the reconstructed image. Further, its sensitivity to data truncation is also much lower than the rearrangement algorithm.

It can be easily seen that the parameters (l, t, v) of the projection data p(l, t, v) of different ray sources when emitting beams are not fully the same, i.e., corresponding to different scanning angles, and there is a redundancy in the data if the parameters are the same. Accordingly, a weighted process is performed. The simplest weighted process is to average the projection data of the same parameters. If the distances of the individual ray sources to the detector are different, it implies that the scanning planes of the individual ray sources for a same point of the object under examination are different, which may result in the occurrence of artifacts in the final reconstructed image of an image. Therefore, the individual ray sources preferably need to be in the same plane parallel to the array of detectors in order to gain an image of high quality. More preferably, the individual ray sources are in a line parallel to the array of detectors.

Figure 6:
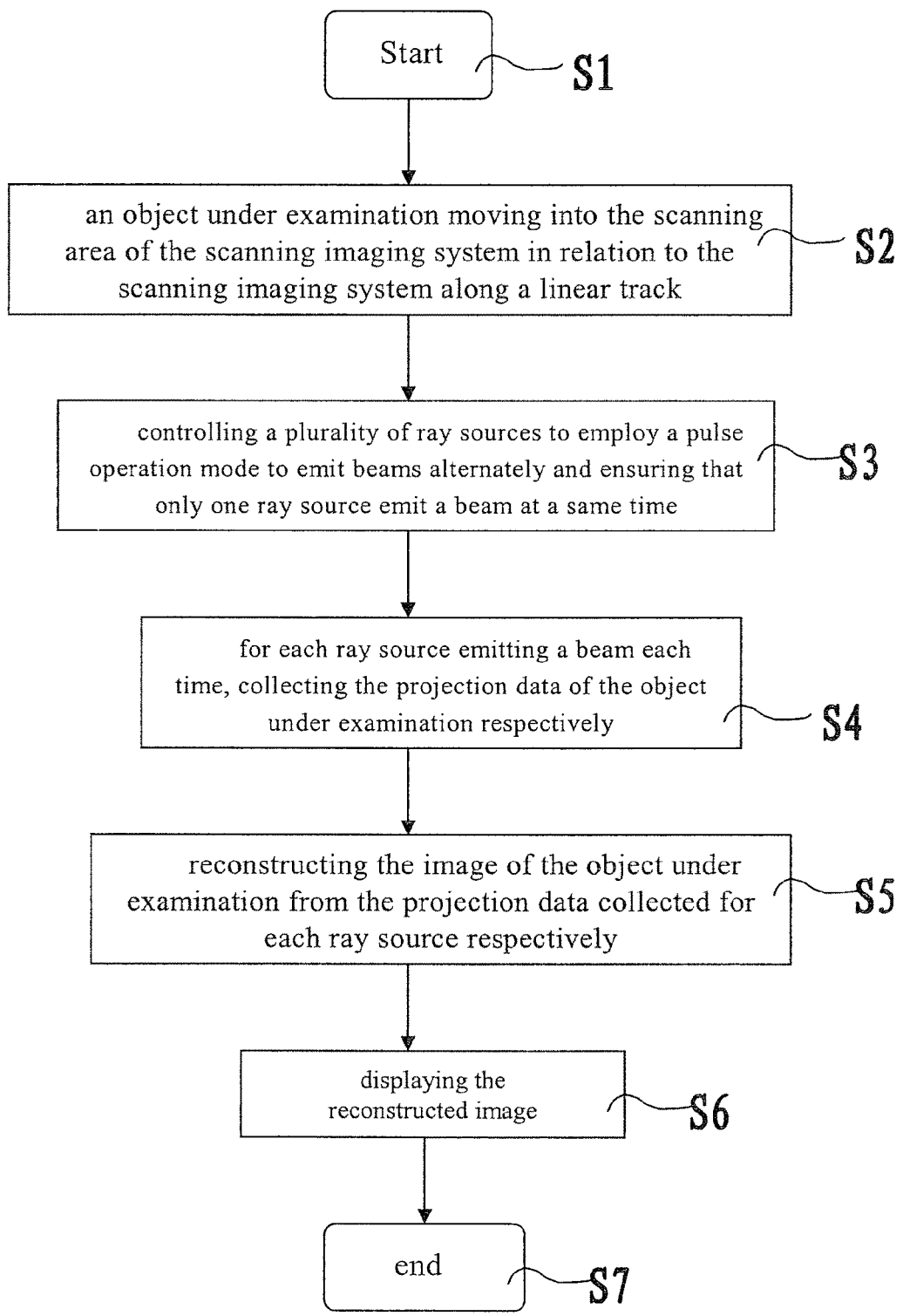
FIG. 6 is a flow chart that illustrates a multi-source linear track scanning imaging method, according to an example embodiment of the present invention.

FIG. 6 is a flow chart of a multi-source linear track scanning imaging method, according to an example embodiment of the present invention. The multi-source linear track scanning imaging method begins with step S1. In step S2, the actuating arrangement 18 causes an object under examination to move into the scanning area of the scanning imaging system in relation to the scanning imaging system along a linear track. In a preferred embodiment, the ray generating unit 11 and the data collecting unit 12 keep stationary, and the actuating arrangement 18 carries the object under examination and causes it to move along the travel track. In step S3, the main control unit 17 controls a plurality of ray sources to emit beams alternately and ensures that only one ray source emits a beam at any one time. Preferably, the plurality of ray sources employ a pulse operation mode to emit beams alternately. In step S4, for each ray source emitting a beam each time, the projection data of the object under examination are collected respectively by the data collecting unit 12, and the ray source emitting a beam is in synchronization with the data collection of the data collecting unit, which synchronization may be controlled by a same trigger pulse sequence. When the object under examination is ready to enter into the scanning range of a first ray source (which may be detected by a position triggering arrangement), the data collecting unit 12 starts to collect data. In step S5, the imaging unit 13 reconstructs the image of the object under examination from the projection data collected for each ray source respectively. In step S6, the display unit 16 displays the reconstructed image. Preferably, operations of image processing and recognition are performed on the reconstructed image to recognize a dangerous article before the reconstructed image is displayed on the display unit 16. Preferably, the reconstructed image is corrected to optimize the reconstructed image before the reconstructed image is displayed on the display unit 16. Preferably, it is possible to reconstruct and display conventional perspective images of a single angle or multiple viewing angles, and thus it is possible to perform an initial examination of the object under examination by first acquiring a perspective image thereof, implementing tomography for the object under examination only when there is found a possible suspect region, and thereby performing a further examination on the suspect region. Finally, in step S7, the multi-source linear track scanning imaging method in accordance with the invention ends.

Figure 7:
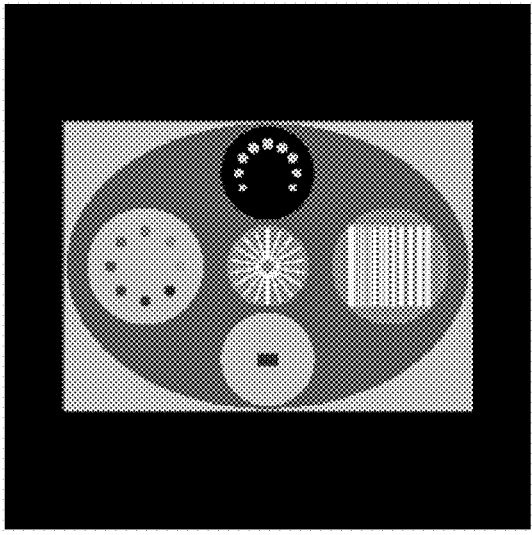
FIG. 7 illustrates a comparison of the effects of simulation images (in x-y plane) obtained by an imaging system, according to an example embodiment of the present invention, in the case of different horizontal field angles of ray sources.
Figure 7:
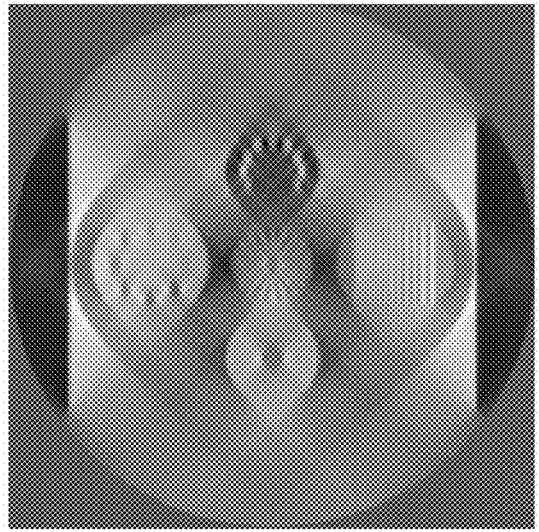
Figure 7:
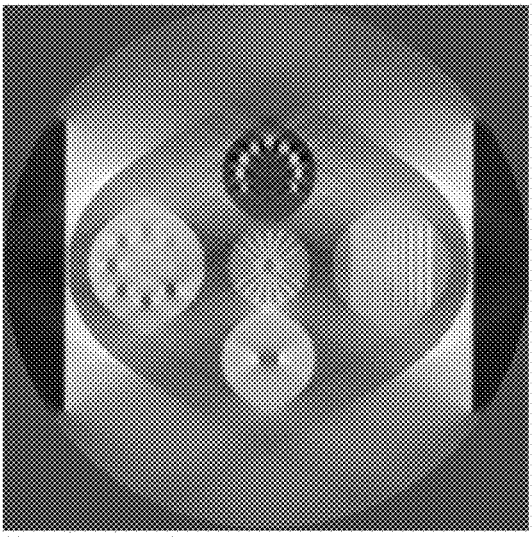
Figure 7:
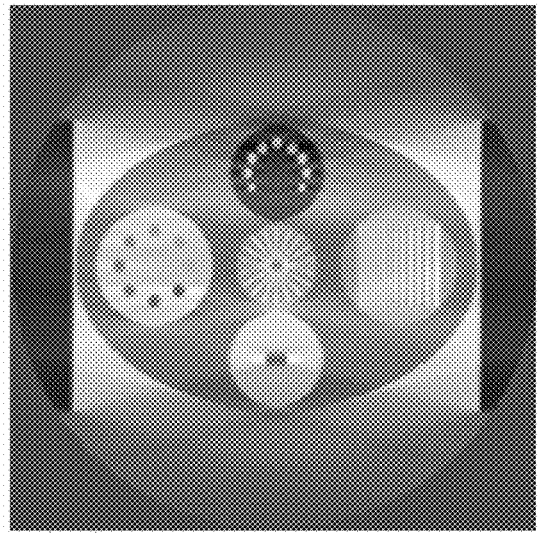

FIG. 7 schematically illustrates a comparison of the effects of simulation images (in x-y plane) obtained by the imaging system in the case of different horizontal field angles of a ray source. FIG. 7 illustrates the results of the simulation experiment performed on a baggage model. In the simulation experiment illustrated in FIG. 7, 2 ray sources are used, the range of scanning viewing angle of each ray source being set to 45, 60, and 75 degrees. Part (a) of FIG. 7 is a schematic diagram of the experiment model, part (b) is the reconstruction result in the case of the total scanning viewing angle being 90 degrees (45×2), part (c) is the reconstruction result in the case of the total scanning viewing angle being 120 degrees (60×2), and part (d) is the reconstruction result in the case of the total scanning viewing angle being 150 degrees (75×2).

Figure 8:
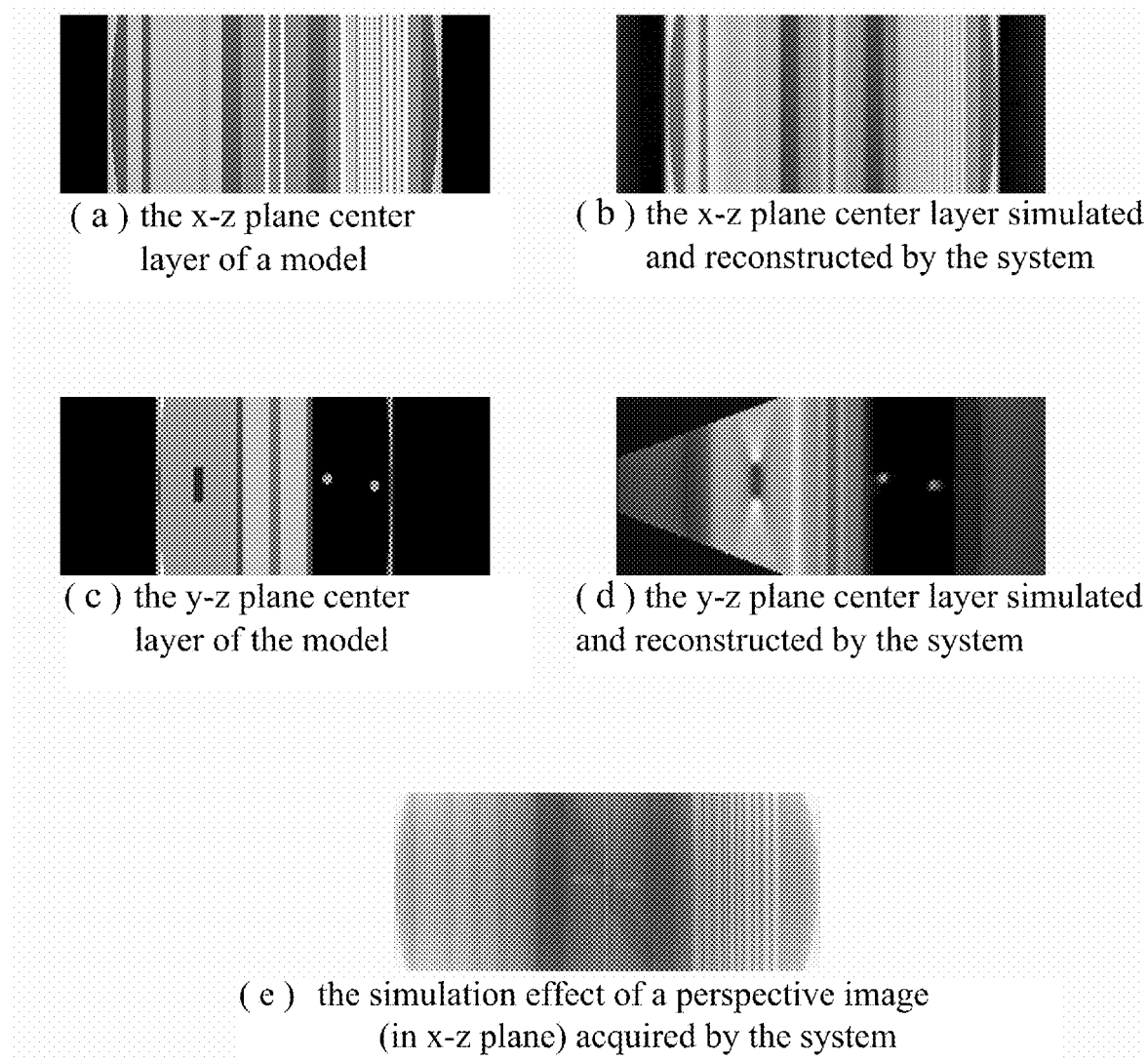
FIG. 8 illustrates a comparison of the effects of the perspective images and the tomographic images (in the x-z plane and the y-z plane) reconstructed by an imaging system, according to an example embodiment of the present invention.

FIG. 8 illustrates a comparison of the effects of the perspective images and the tomographic images (in the x-z plane and the y-z plane) reconstructed by the imaging system. FIG. 8 illustrates the results of the simulation experiment performed on the same baggage model as in FIG. 7. In the simulation experiment illustrated in FIG. 8, 2 ray sources are used, the range of scanning viewing angle of each ray source being 60 degrees. Part (a) of FIG. 8 is a schematic diagram of the x-z plane center layer of the model, part (b) shows an effect drawing of the x-z plane center layer simulated and reconstructed by the system, part (c) is a schematic diagram of the y-z plane center layer of the model, part (d) is an effect drawing of the y-z plane center layer simulated and reconstructed by the system, and part (e) is a simulation effect of a perspective image (in x-z plane) acquired by the system.

Those skilled in the art can appreciate from the foregoing description that the present invention may be implemented in a variety of forms, that the various embodiments may be implemented alone or in combination, and that the above described example embodiments are not used for limiting the present invention. Therefore, while the embodiments of the present invention have been described in connection with particular examples thereof, the true scope of the embodiments of the present invention should not be so limited since other modifications will become apparent to the skilled practitioner upon a study of the drawings, specification, and following claims. Many duplicate and alternative solutions, including modifications, additions, permutations, and variations, will be apparent to those skilled in the art in light of the disclosed content of the present application and should fall within the protection scope of the present invention.

What is claimed is:

1. A linear track scanning imaging system, comprising:
    a ray generating unit comprising a plurality of ray sources, wherein the linear track scanning imaging system is configured for the plurality of ray sources to emit beams such that only one of the plurality of ray sources emits a beam at any one time;
    an actuating arrangement configured to cause an object under examination to perform a relative movement with respect to the linear track scanning system along a linear track, thereby leading the object under examination to pass through a scanning area of the linear track scanning imaging system;
    a data collecting unit configured to collect projection data of the object under examination obtained from the beams emitted by the ray sources;
    an imaging unit configured to construct a computed tomography (CT) image of the object under examination based on the collected projection data; and
    a display unit configured to display the constructed image;
    wherein the plurality of ray sources are located in a plane parallel to the linear track along which the object under examination moves.

2. The linear track scanning imaging system according to claim 1, wherein the plurality of ray sources employ a pulse operation mode for the alternate beam emission.

3. The linear track scanning imaging system according to claim 2, further comprising:
    a trigger pulse generator configured to generate a trigger pulse sequence for each of the plurality of ray sources respectively to control the alternation of beam emission by the plurality of ray sources.

4. The linear track scanning imaging system according to claim 3, wherein the trigger pulses generated by the trigger pulse generator are also delivered to the data collecting unit to control a time sequence of data collection.

5. The linear track scanning imaging system according to claim 1, further comprising:
    a main control unit for controlling and coordinating operations of at least the ray generating unit, the actuating arrangement, and the data collecting unit.

6. The linear track scanning imaging system according to claim 1, wherein the plurality of ray sources are located in a line parallel to the linear track along which the object under examination moves.

7. The linear track scanning imaging system according to claim 1, wherein ranges of ray scanning viewing angles of the plurality of ray sources are continuous, thereby forming a continuous range of a scanning viewing angle.

8. The linear track scanning imaging system according to claim 7, wherein the ranges of ray scanning viewing angles of the plurality of ray sources partially overlap one another.

9. The linear track scanning imaging system according to claim 1, further comprising:
    a correction unit configured to correct the constructed image before the constructed image is displayed.

10. The linear track scanning imaging system according to claim 1, further comprising:
    an image processing and recognition unit configured to perform image processing and pattern recognition on the constructed image.

11. The linear track scanning imaging system according to claim 1, wherein the relative movement of the object under examination with respect to the linear track scanning system is at a uniform velocity.

12. The linear track scanning imaging system according to claim 1, wherein the actuating arrangement comprises an electrical control unit for controlling the actuating arrangement and thereby controlling the relative movement between the object under examination and the linear track scanning system.

13. The linear track scanning imaging system according to claim 1, wherein the imaging unit constructs a stereo image of the object under examination by generating a perspective image and a tomographic image of the object under examination.

14. The linear track scanning imaging system according to claim 1, wherein projection data collection of the data collecting unit is synchronized with beam emission of the plurality of ray sources.

15. The linear track scanning imaging system according to claim 1, wherein the data collecting unit is a linear array of detectors or a planar array of detectors that is parallel to the linear track along which the object under examination moves.

16. The linear track scanning imaging system according to claim 1, wherein the linear track scanning imaging system is configured for the plurality of ray sources to emit beams alternately.

17. The linear track scanning imaging system according to claim 1, wherein each of the ray sources intermittently emits a respective beam at a respective interval, and wherein the intervals are staggered, such that a beam emission by a first one of the ray sources occurs between two beam emissions by a second one of the ray sources.

18. The linear track scanning imaging system according to claim 1, wherein some parameters of the projection data differ between different ones of the plurality of ray sources and other parameters of the projection data are the same for the different ones of the plurality of ray sources, and wherein the image construction includes a weighting process is performed between the projection data of the different ones of the plurality of ray sources with respect to the parameters that are the same for the different ones of the plurality of ray sources.

19. A linear track scanning imaging method, comprising the steps of:
 an object under examination moving with respect to a scanning imaging system into a scanning area of the scanning imaging system;
 controlling a plurality of ray sources to emit beams such that only one ray source emits a beam at any one time;
 for each ray source, an array of detectors collecting corresponding projection data;
 constructing a computed tomography (CT) image of the object under examination based on the projection data collected for each ray source; and
 displaying the constructed image;
 wherein the plurality of ray sources are located in a plane parallel to the moving track of the object under examination.

20. The method according to claim 19, wherein the plurality of ray sources employ a pulse operation mode for the alternate beam emission.

21. The method according to claim 20, further comprising the step of:
 generating a trigger pulse sequence for each of the plurality of ray sources respectively to control the alternation of beam emission by the plurality of ray sources.

22. The method according to claim 21, further comprising the step of:
 delivering the generated trigger pulses to the data collecting unit for controlling a time sequence of data collection.

23. The method according to claim 19, wherein the plurality of ray sources are located in a line parallel to the moving track of the object under examination.

24. The method according to any claim 19, wherein ranges of ray scanning viewing angles of the plurality of ray sources are continuous, thereby forming a continuous range of a scanning viewing angle.

25. The method according to claim 24, wherein the ranges of ray scanning viewing angles of the plurality of ray sources partially overlap one another.

26. The method according to claim 19, further comprising:
 correcting the constructed image before the constructed image is displayed.

27. The method according to claim 19, further comprising the step of:
 performing processing and recognition on the constructed image.

28. The method according to a claim 19, wherein the movement of the object under examination with respect to the scanning imaging system is at a uniform velocity.

29. The method according to claim 19, wherein a stereo image of the object under examination is constructed by generating a perspective image and a tomographic image of the object under examination.

30. The method according to claim 19, wherein projection data collection is synchronized with beam emission of each of the plurality of ray sources.

31. The method according to claim 19, wherein the projection data are collected via a linear array of detectors or a planar array of detectors.

32. The method according to claim 19, wherein the control of the plurality of ray beams is such that the plurality of ray beams emit beams alternately.

33. The method according to claim 19, wherein the array of detectors is located in a plane parallel to the moving track of the object under examination.

* * * * *